(12) United States Patent
Urabe

(10) Patent No.: US 12,132,861 B2
(45) Date of Patent: Oct. 29, 2024

(54) SUSPICIOUS CALL HANDLING SYSTEM, SUSPICIOUS CALL HANDLING METHOD, OUTGOING/INCOMING CALL INFORMATION COLLECTION SERVER AND PROGRAM

(71) Applicant: Nippon Telegraph and Telephone Corporation, Tokyo (JP)

(72) Inventor: Mai Urabe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 448 days.

(21) Appl. No.: 17/622,189

(22) PCT Filed: Jun. 26, 2019

(86) PCT No.: PCT/JP2019/025332
§ 371 (c)(1),
(2) Date: Dec. 22, 2021

(87) PCT Pub. No.: WO2020/261416
PCT Pub. Date: Dec. 30, 2020

(65) Prior Publication Data
US 2022/0417360 A1    Dec. 29, 2022

(51) Int. Cl.
*H04M 3/436* (2006.01)
*H04M 3/22* (2006.01)

(52) U.S. Cl.
CPC ....... *H04M 3/4365* (2013.01); *H04M 3/2281* (2013.01)

(58) Field of Classification Search
CPC ........ H04M 3/22; H04M 3/2281; H04M 3/42; H04M 3/436; H04M 3/4365; H04M 19/04; H04M 2203/6027

(Continued)

(56) References Cited

U.S. PATENT DOCUMENTS

| 2008/0095347 A1* | 4/2008 | Fotta .................. H04L 65/1079 379/201.03 |
| 2020/0045169 A1* | 2/2020 | Claxton ............ H04M 3/42059 |
| 2022/0272194 A1* | 8/2022 | Ives ...................... H04M 3/436 |

FOREIGN PATENT DOCUMENTS

| JP | 4095533 | 3/2008 |
| JP | 2015213222 | 11/2015 |

* cited by examiner

Primary Examiner — Harry S Hong
(74) Attorney, Agent, or Firm — Fish & Richardson P.C.

(57) ABSTRACT

A suspicious call handling system that detects and handles a suspicious call within a communication network includes an outgoing and incoming call information collecting server 10 and session control servers 20A to 20C. The outgoing and incoming call information collecting server 10 includes a storage unit 15 that stores a suspicious call condition, a collecting unit 11 that collects outgoing and incoming call information from each of the session control servers 20A to 20C within a communication network, and a searching unit 12 that searches for a phone call that matches the suspicious call condition from the outgoing and incoming call information and gives a notification of the phone call to the session control servers 20A to 20C accommodating a user to which the phone call is connected. The session control servers 20A to 20C include an action unit 24 that executes an action, which has been set in advance, in a case where it is detected that a call has been transmitted to a user who has received the notification from the outgoing and incoming call information collecting server 10.

4 Claims, 14 Drawing Sheets

(58) Field of Classification Search
USPC ....... 379/188, 196–198, 210.02, 210.03, 249
See application file for complete search history.

| SERIAL NUMBER | CALLED PARTY | CALLING PARTY | COMMUNICATION START TIME | COMMUNICATION TERMINATION TIME | OUTGOING SERVER TYPE | ... |
|---|---|---|---|---|---|---|
| 1 | 03-xxxx-xxxx | 050-xxxx-xxxx | 2018/11/30 09:12:16.1 | 2018/11/30 09:12:59.5 | | |
| ... | ... | ... | ... | ... | ... | |

Fig. 3

| CONDITION |
|---|
| COMMUNICATION TIME IS GREATER THAN N |
| COMMUNICATION INTERVAL IS LESS THAN M |
| COMMUNICATION IS PERFORMED WITH AREA IN WHICH FREQUENCY OF COMMUNICATION IS LESS THAN L |
| .... |

Fig. 4

| SERIAL NUMBER | ACTION |
|---|---|
| 1 | RECORD PHONE CALL |
| 2 | GIVE GUIDANCE TO CALLING PARTY |
| 3 | TRANSMIT MAIL |
| .... | .... |

Fig. 5

| SERIAL NUMBER | CONDITION |
|---|---|
| 1 | CASE OF INCOMING CALL |
| 2 | CASE OF OUTGOING CALL |
| 3 | CASE OF INCOMING CALL AND OUTGOING CALL |
| .... | .... |

Fig. 6

| PHONE NUMBER | ACTION | CONDITION |
|---|---|---|
| 03 – xxxx – xxxx | 1 | 3 |
| 03 – yyyy – yyyy | 2 | 1 |
| 043 – xxx –xxxx | 3 | 1 |
| .... | .... | .... |

Fig. 7

| PHONE NUMBER | ACTION | CONDITION | NOTIFICATION FLAG |
|---|---|---|---|
| 03 - xxxx - xxxx | 1 | 3 | START |
| 03 - yyyy - yyyy | 2 | 1 | STOP |
| 043 - xxx -xxxx | 3 | 1 | STOP |
| .... | .... | .... | .... |

Fig. 9

SUSPICIOUS CALL HANDLING SYSTEM, SUSPICIOUS CALL HANDLING METHOD, OUTGOING/INCOMING CALL INFORMATION COLLECTION SERVER AND PROGRAM

CROSS-REFERENCE TO RELATED APPLICATIONS

This application is a National Stage application under 35 U.S.C. § 371 of International Application No. PCT/JP2019/025332, having an International Filing Date of Jun. 26, 2019, the disclosure of which is considered part of the disclosure of this application, and is incorporated in its entirety into this application.

TECHNICAL FIELD

The present invention relates to a suspicious call handling system, a suspicious call handling method, an outgoing and incoming call information collecting server, and a program.

BACKGROUND ART

Patent Literature 1 discloses a technique for performing connection control based on connection conditions such as an outgoing call phone number for allowing connection, a time slot for allowing connection, and the number of times connection is allowed, as means for avoiding bank-transfer fraud using a telephone, such as billing fraud. In addition, a technique for restricting a calling party, which is capable of receiving calls, by using an incoming call acceptance database and an incoming call rejection database, and a technique for restricting incoming calls by searching for an incoming call history having a large number of outgoing calls per unit time and having a short call time and extracting a phone number of a calling party from the incoming call history are known.

CITATION LIST

Patent Literature

Patent Literature 1: JP 4095533 B

SUMMARY OF THE INVENTION

Technical Problem

However, in the related art, it is necessary to set a phone number for which an incoming call is allowed or set a phone number for which an incoming call will be rejected on an incoming call side. A technique using an incoming call history has a problem that a suspicious call from a new phone number cannot be handled.

The present invention is contrived in view of the above-described circumstances, and an object thereof is to reduce damage due to special fraud without imposing a burden on a called party.

Means for Solving the Problem

A suspicious call handling system according to an aspect of the present invention is a suspicious call handling system that detects and handles a suspicious call within a communication network and includes an outgoing and incoming call information collecting server; and a session control server, in which the outgoing and incoming call information collecting server includes a storage unit configured to store suspicious call conditions, a collecting unit configured to collect outgoing and incoming call information from each of a plurality of the session control servers within the communication network, and a searching unit configured to search for a phone call that matches the suspicious call conditions in the outgoing and incoming call information and give a notification of the phone call to the session control server accommodating a user to which the phone call has been connected, and the session control server includes an action unit configured to execute an action, which has been set in advance, in a case where it is detected that a call has been transmitted to the user who has received the notification from the outgoing and incoming call information collecting server.

A suspicious call handling method according to an aspect of the present invention is a suspicious call handling method of detecting and handling a suspicious call within a communication network and includes collecting outgoing and incoming call information from each of a plurality of session control servers within the communication network, searching for a phone call that matches a suspicious call condition from the outgoing and incoming call information, and executing an action, which has been set in advance, in a case where the session control server accommodating a user to which the phone call is connected has detected a call transmitted to the user.

An outgoing and incoming call information collecting server according to an aspect of the present invention is an outgoing and incoming call information collecting server that detects a suspicious call within a communication network and includes a storage unit configured to store a suspicious call condition, a collecting unit configured to collect outgoing and incoming call information from each of a plurality of session control servers within the communication network, and a searching unit configured to search for a phone call that matches the suspicious call condition from the outgoing and incoming call information and give a notification of the phone call to the session control server accommodating a user to which the phone call is connected.

Effects of the Invention

According to the present invention, it is possible to achieve a reduction in special fraud damage without imposing a burden on a called party.

BRIEF DESCRIPTION OF DRAWINGS

FIG. 3 is a diagram illustrating an example of outgoing and incoming call information.

FIG. 4 is a diagram illustrating an example of suspicious call conditions.

FIG. 5 is a diagram illustrating an example of actions.

FIG. 6 is a diagram illustrating an example of conditions indicating a timing at which an action is executed.

FIG. 7 is a diagram illustrating an example of user information.

FIG. 9 is a diagram illustrating an example of user information stored by a session control server.

DESCRIPTION OF EMBODIMENTS

Hereinafter, an embodiment of the present invention will be described with reference to the accompanying drawings.

Figure 1:
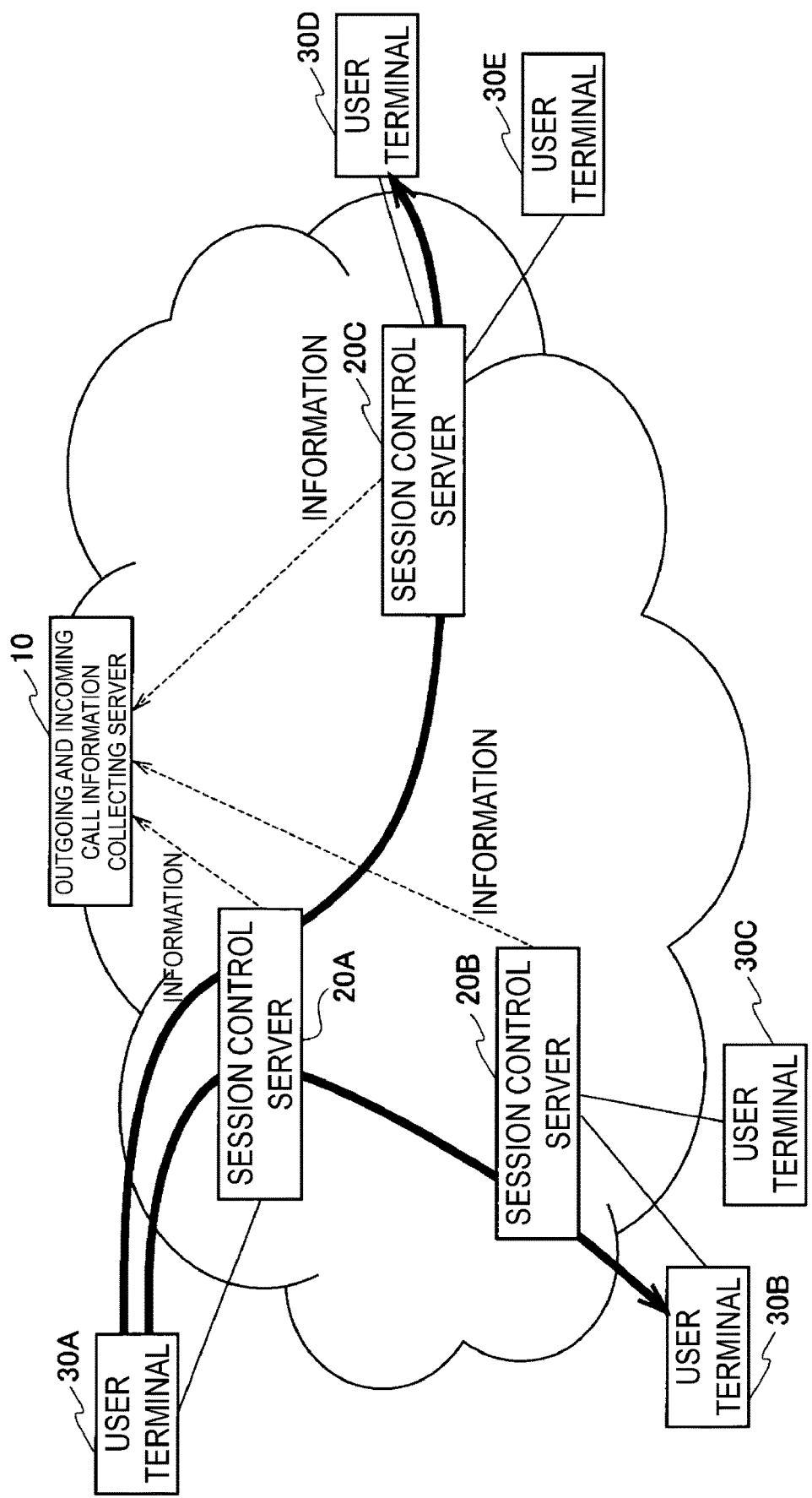
FIG. 1 is a diagram illustrating an overall configuration of a suspicious call handling system according to the present embodiment.

Referring to FIG. 1, a suspicious call handling system of the present embodiment will be described. The suspicious call handling system illustrated in the drawing includes an outgoing and incoming call information collecting server 10 and session control servers 20A to 20C within a communication network. User terminals 30A to 30E are accommodated in the session control servers 20A to 20C. The present embodiment is not limited to an IP telephone network, can also be applied to a public telephone network, and can be applied to both an IP telephone network and a public telephone network.

The outgoing and incoming call information collecting server 10 periodically collects outgoing and incoming call information such as a call detail record (CDR) from each of the session control servers 20A to 20C, and searches for a suspicious call from the collected information. In a case where a suspicious call has been found, the outgoing and incoming call information collecting server 10 gives a notification of the suspicious call to the session control servers 20A to 20C that accommodate users to which suspicious calls are transmitted.

The session control servers 20A to 20C perform call control upon authenticating the user terminals 30A to 30E of calling parties so as to provide a quality and a band suitable for each service. For example, when the user terminal 30A makes a call to the user terminal 30B, the session control server 20A that accommodates the user terminal 30A authenticates the user terminal 30A, and transmits the call to the session control server 20B accommodating the user terminal 30B to which an incoming call is transmitted. The session control server 20B calls the user terminal 30B. When the user terminal 30B responds, a session is established between the user terminals 30A and 30B, and thus a phone call is enabled. The session control servers 20A to 20C record information to be used for billing and a history of call control, and transmit this information to the outgoing and incoming call information collecting server 10.

The session control servers 20A to 20C receive a notification of a user having a suspicious call from the outgoing and incoming call information collecting server 10 and execute handling (action) set in advance.

The user terminals 30A to 30E are general-purpose terminals equipped with a telephone call function. The user terminals 30A to 30E are, for example, IP telephones.

Figure 2:
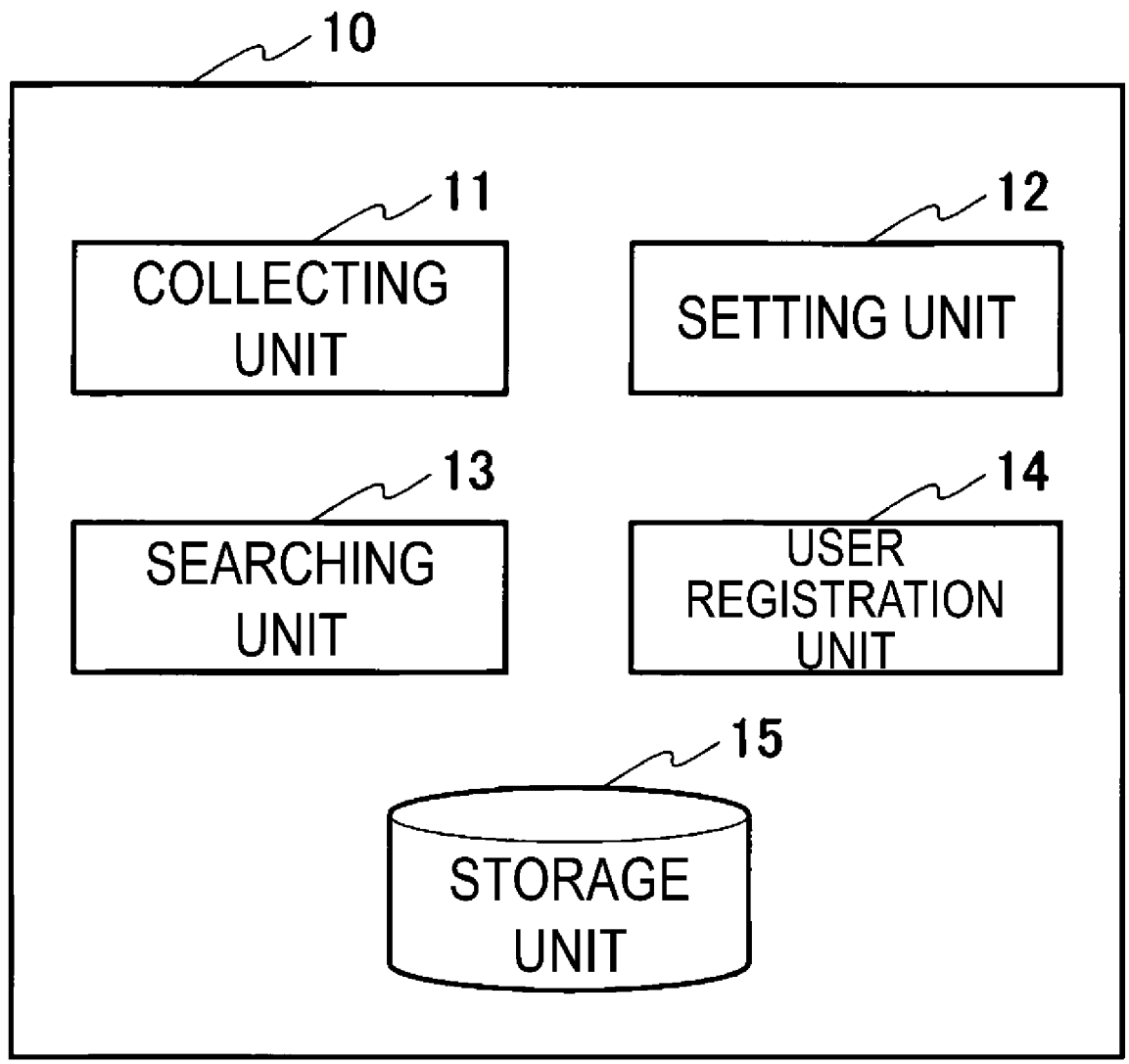
FIG. 2 is a functional block diagram illustrating a configuration of an outgoing and incoming call information collecting server.

Referring to FIG. 2, the outgoing and incoming call information collecting server will be described. The outgoing and incoming call information collecting server 10 illustrated in the drawing includes a collecting unit 11, a setting unit 12, a searching unit 13, a user registration unit 14, and a storage unit 15.

The collecting unit 11 collects outgoing and incoming call information from all of the session control servers 20A to 20C in a communication network and stores the collected outgoing and incoming call information in the storage unit 15. FIG. 3 illustrates an example of outgoing and incoming call information. In the example in FIG. 3, the outgoing and incoming call information includes information such as a serial number, a phone number of a calling party, a phone number of a called party, a communication start time, a communication termination time, and an outgoing server type. Information other than that described above may be included in the outgoing and incoming call information.

The setting unit 12 sets, updates, or deletes a suspicious call condition regarded as a suspicious call. FIG. 4 illustrates examples of suspicious call conditions. In the example in FIG. 4, as suspicious call conditions, conditions such as a communication time being greater than N, a communication interval being less than M, and communication being performed with an area in which the frequency of communication is less than L are set. The suspicious call conditions are not limited thereto, and composite conditions, such as an emergency report that has not been performed in the past and a call that has been transmitted Y times or more without any information within X days, may be set. In addition, a condition using a user's application information may be set as a suspicious call condition. For example, as suspicious call conditions, conditions such as Z or more phone numbers being assigned to one IP address and calls being frequently made to a plurality of users (B or more users) of an age of A or higher may be set. Priority may be imparted to suspicious call conditions. A score may be set, and a case where a score is equal to or greater than a threshold value may be determined to be a suspicious call. The suspicious call conditions are stored in the storage unit 15.

The setting unit 12 sets an action for a suspicious call, or sets a condition indicating a timing at which the action is to be executed. An example of an action is illustrated in FIG. 5. FIG. 6 illustrates an example of a condition indicating a timing at which an action is to be executed. In the example in FIG. 5, actions such as recording of a phone call, giving of guidance to a calling party, and transmission of a mail are set. In the example of FIG. 6, conditions such as a case of an incoming call, a case of an outgoing call, and a case of incoming and outgoing calls are set. Serial numbers are imparted to the actions and the conditions illustrated in FIGS. 5 and 6 and are stored in the storage unit 15.

The searching unit 13 searches for a phone call that matches suspicious call conditions in outgoing and incoming call information stored in the storage unit 15. When the searching unit 13 has searched for a phone call that matches a suspicious call condition from the outgoing and incoming call information, the searching unit 13 gives a notification of user information to the session control servers 20A to 20C that accommodate the called party of the phone call.

The user registration unit 14 registers or updates user information of a user who desires to take action for a suspicious call. The registration or updating of the user information may be performed based on a contract made with the user. For example, the user information is registered when the user applies for a suspicious call detection service. FIG. 7 illustrates an example of user information. In the example in FIG. 7, the user information includes a phone number of a user, actions, and conditions. The action is an action that the user wants to execute for a suspicious call. The conditions are conditions under which an action is desired to be executed. The actions and the conditions are designated by serial numbers respectively imparted to the actions and the conditions. Note that actions for all users may be indiscriminately set for each of suspicious call conditions.

The user registration unit 14 gives a notification of registered user information to each of the session control servers 20A to 20C which accommodates a corresponding user. The session control servers 20A to 20C store the received user information.

The storage unit 15 stores outgoing and incoming call information, suspicious call conditions, details of actions, action conditions, and user information which are collected from the session control servers 20A to 20C.

Figure 8:
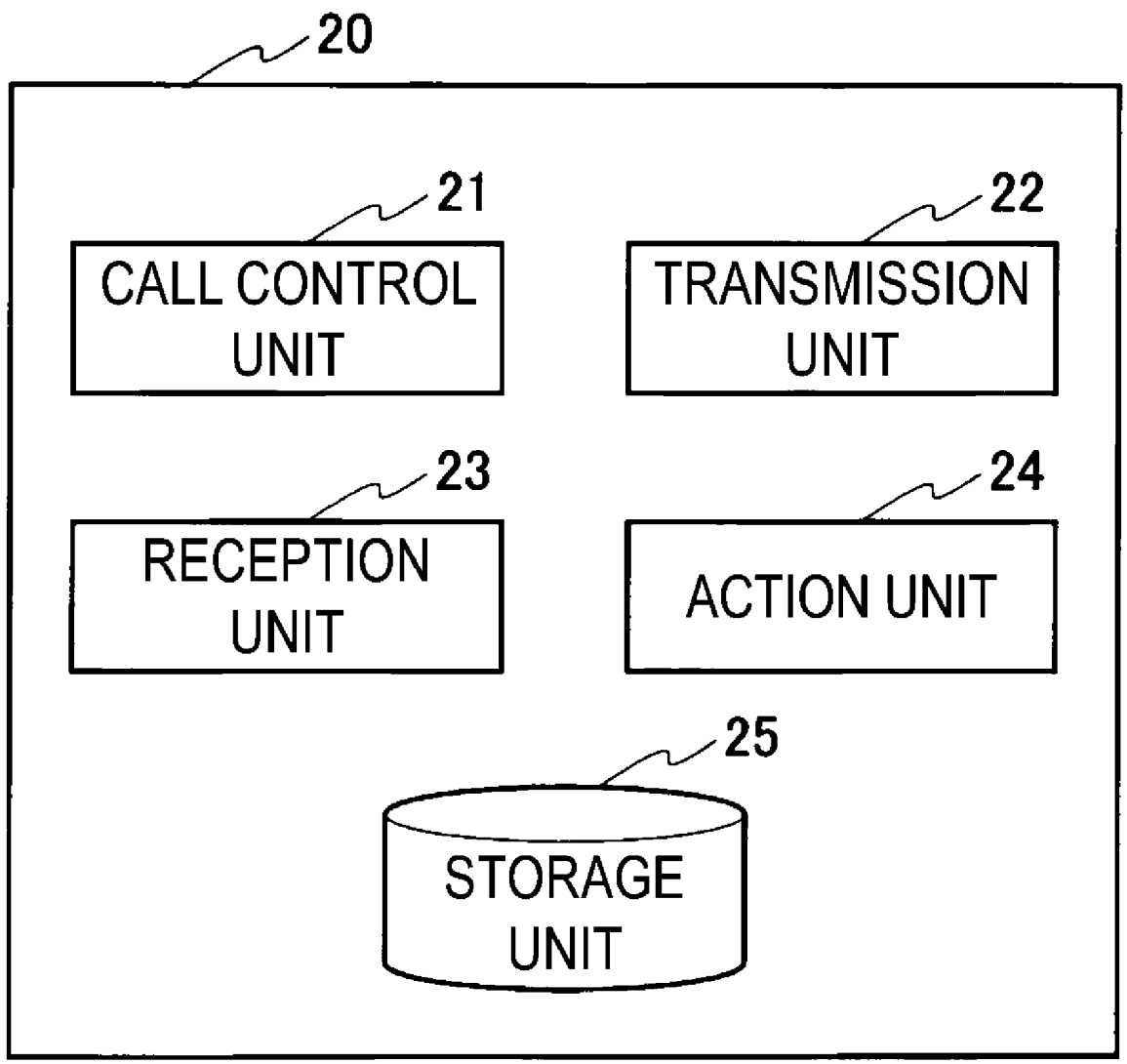
FIG. 8 is a functional block diagram illustrating a configuration of a session control server.

A session control server will be described with reference to FIG. 8. The session control server 20 illustrated in the drawing includes a call control unit 21, a transmission unit 22, a reception unit 23, an action unit 24, and a storage unit 25.

The call control unit 21 performs call control related to outgoing calls from the accommodated user terminals 30A to 30E and incoming calls to the accommodated user terminals 30A to 30E. The call control unit 21 stores outgoing and incoming call information on communication on which call control has been performed in the storage unit 25.

The transmission unit 22 transmits the outgoing and incoming call information stored in the storage unit 25 to the outgoing and incoming call information collecting server 10.

The reception unit 23 receives user information of a user who desires to take action for a suspicious call from the outgoing and incoming call information collecting server 10, and stores the received user information in the storage unit 25. FIG. 9 illustrates an example of user information stored in the session control server 20. The user information in FIG. 9 is information in which a notification flag has been added to the user information stored in the outgoing and incoming call information collecting server 10. The notification flag is information indicating whether a notification, indicating that a suspicious call has been made to an accommodated user, has been received from the outgoing and incoming call information collecting server 10.

The action unit 24 executes an action on communication of a user based on information registered in user information of an accommodated user. For example, the action unit 24 records a phone call, gives guidance to a calling party and a called party, or transmits a mail indicating that a suspicious call has been received.

The storage unit 25 stores outgoing and incoming call information and user information.

A flow of processing of the outgoing and incoming call information collecting server 10 will be described with reference to FIGS. 10 to 12.

First, a flow of the overall processing of the outgoing and incoming call information collecting server 10 will be described with reference to FIG. 10.

Figure 10:
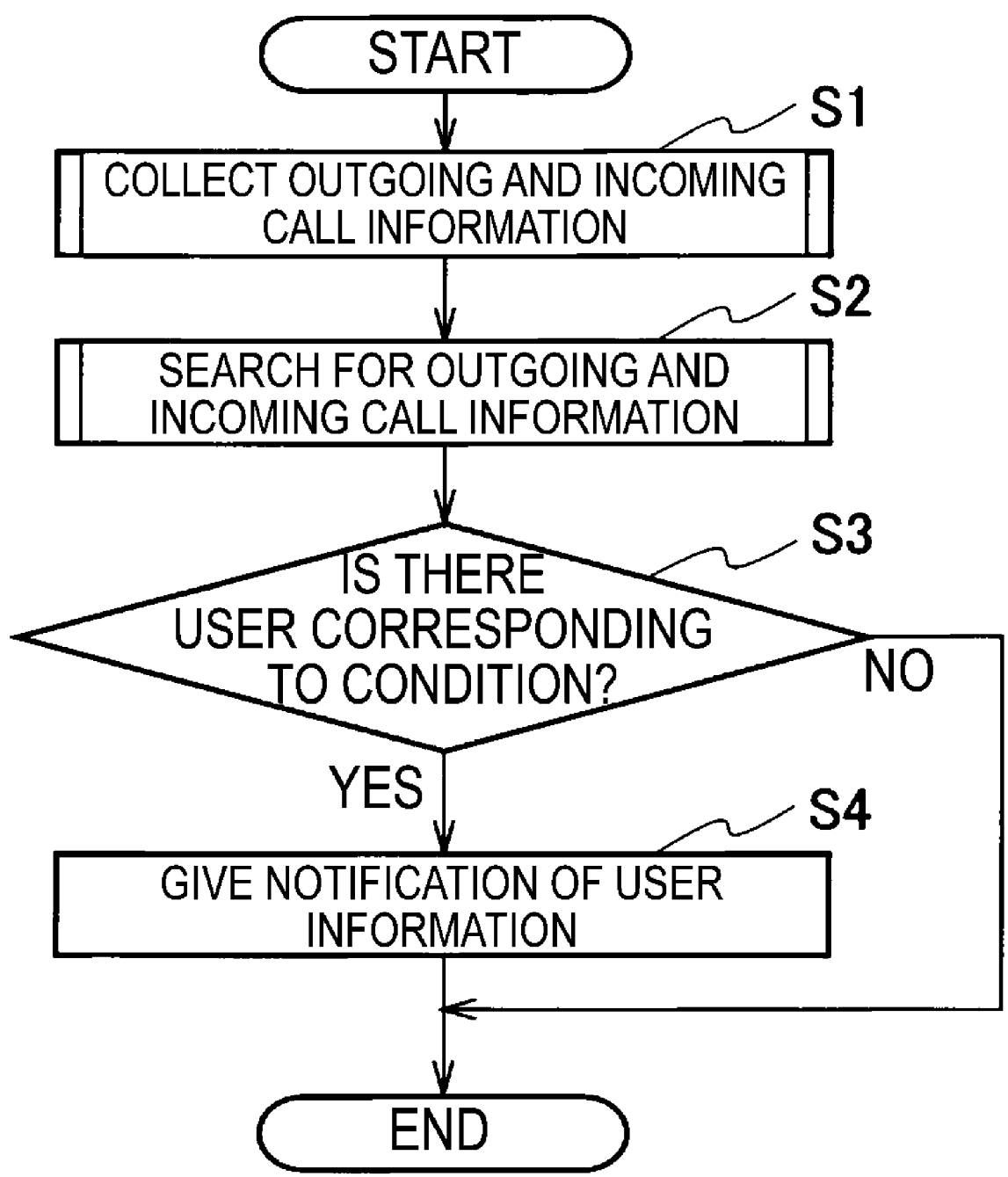
FIG. 10 is a flowchart illustrating a flow of overall processing of the outgoing and incoming call information collecting server.
Figure 11:
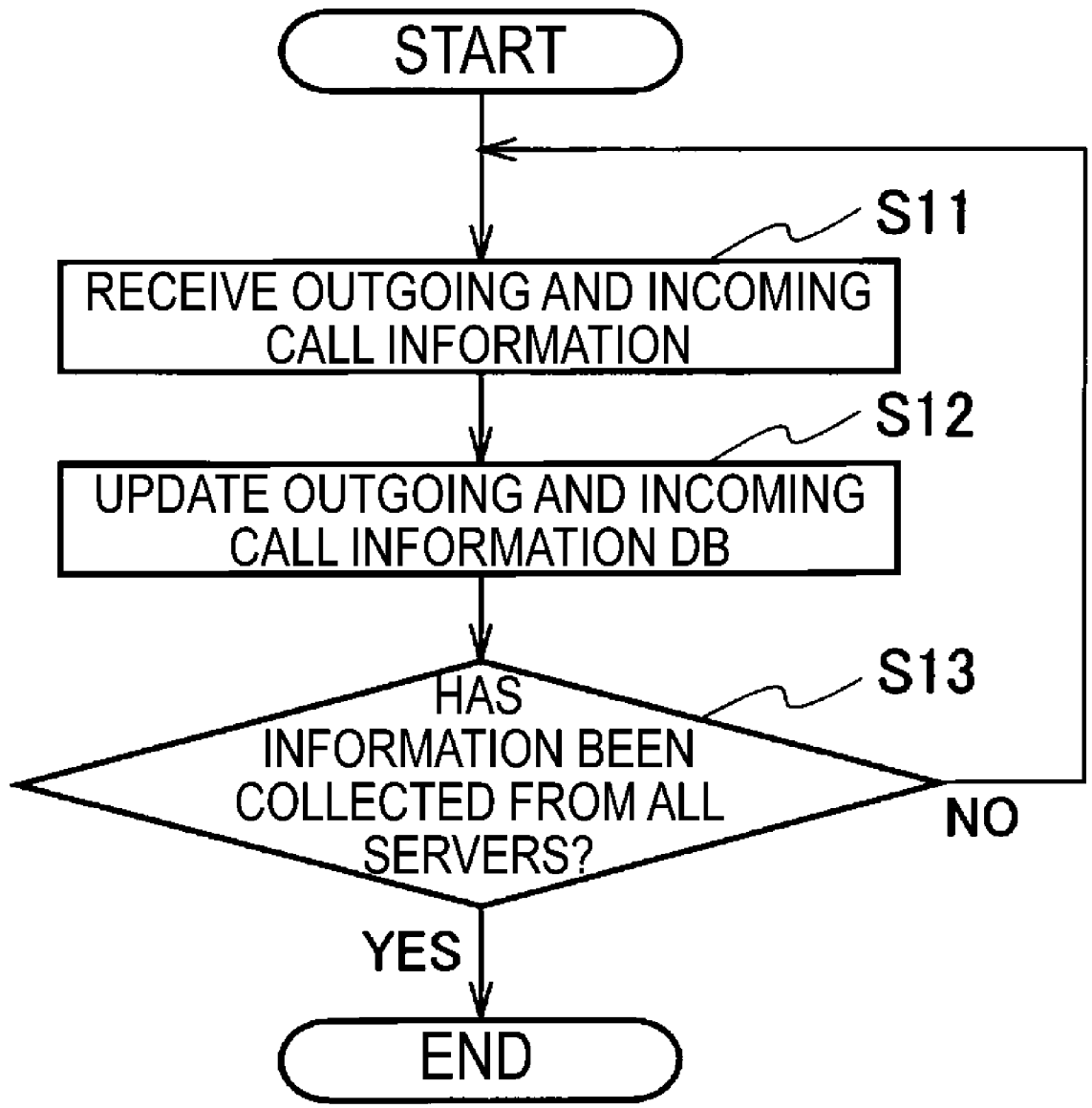
FIG. 11 is a flowchart illustrating a flow of processing in which the outgoing and incoming call information collecting server collects outgoing and incoming call information.

The outgoing and incoming call information collecting server 10 periodically executes the processing in FIG. 10 to detect a suspicious call. The outgoing and incoming call information collecting server 10 stores the various information illustrated in FIGS. 3 to 7.

In step S1, the outgoing and incoming call information collecting server 10 collects outgoing and incoming call information from all of the session control servers 20A to 20C.

In step S2, the outgoing and incoming call information collecting server 10 searches for a phone call that corresponds to suspicious call conditions from the collected outgoing and incoming call information.

In step S3, the outgoing and incoming call information collecting server 10 determines whether or not there is a phone call corresponding to suspicious call conditions. The outgoing and incoming call information collecting server 10 terminates the processing when there is no phone call corresponding to the suspicious call conditions.

In step S4, the outgoing and incoming call information collecting server 10 gives a notification of user information to the session control servers 20A to 20C that accommodate users of phone calls corresponding to the suspicious call conditions. The session control servers 20A to 20C receive the notification and initiate a notification flag of the corresponding user information. The session control servers 20A to 20C stop the notification flag for user information that has not been notified.

A flow of processing in which the outgoing and incoming call information collecting server 10 collects outgoing and incoming call information will be described with reference to FIG. 11.

In step S11, the outgoing and incoming call information collecting server 10 receives outgoing and incoming call information from the session control servers 20A to 20C.

In step S12, the outgoing and incoming call information collecting server 10 stores the received outgoing and incoming call information in the storage unit 15. The outgoing and incoming call information stored in the storage unit 15 may be deleted after a predetermined period of time has elapsed.

In step S13, the outgoing and incoming call information collecting server 10 determines whether or not outgoing and incoming call information has been received from all of the session control servers 20A to 20C. In a case where outgoing and incoming call information has been received from all of the session control servers 20A to 20C, the processing is terminated.

In a case where some or all of the session control servers 20A to 20C have not transmitted the outgoing and incoming call information, the processing returns to step S11, and the incoming call information collecting server 10 receives the outgoing and incoming call information.

Figure 12:
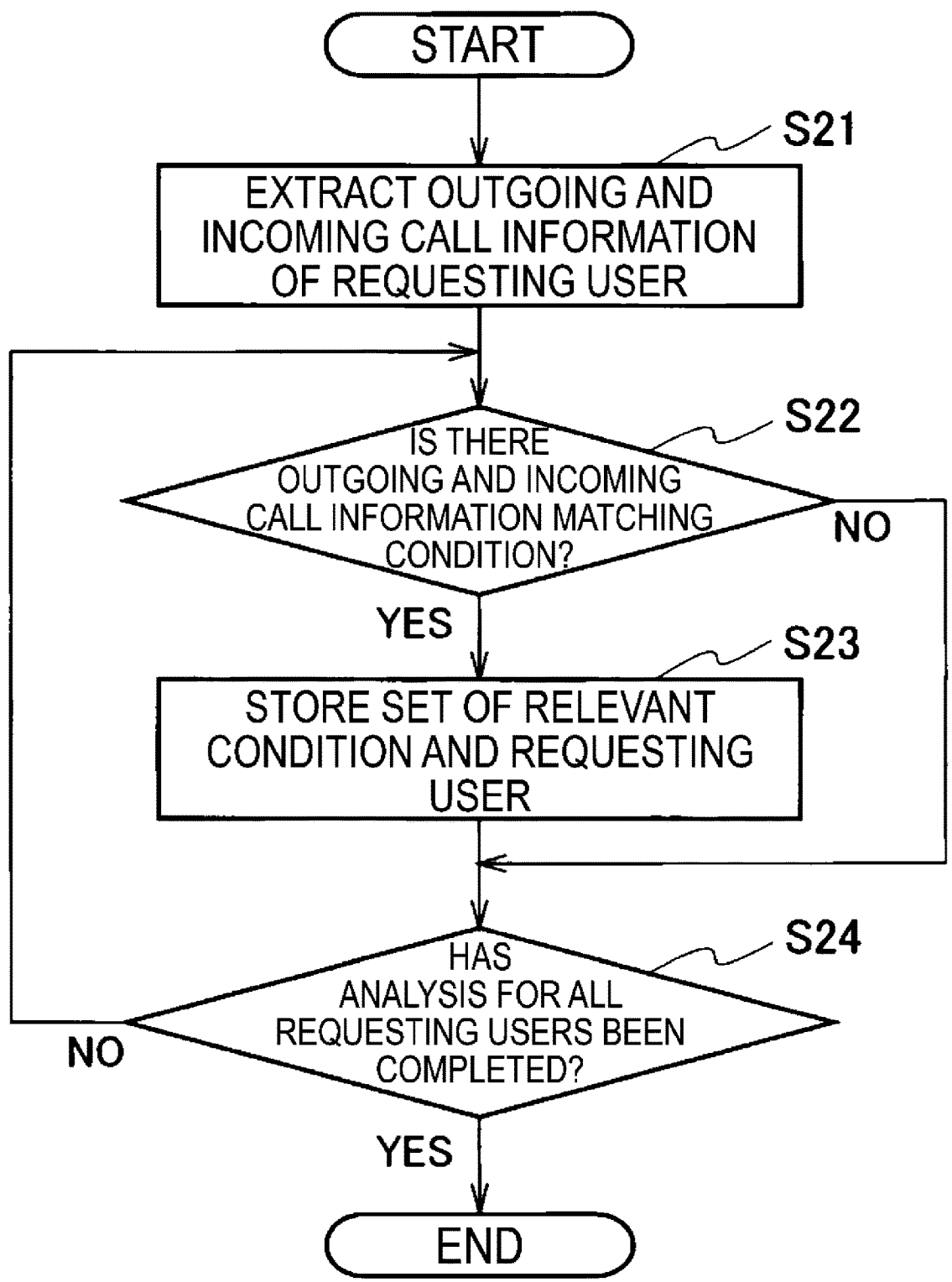
FIG. 12 is a flowchart illustrating a flow of processing in which the outgoing and incoming call information collecting server searches for suspicious calls.

Referring to FIG. 12, a flow of processing in which the outgoing and incoming call information collecting server 10 searches for a suspicious call will be described.

In step S21, the outgoing and incoming call information collecting server 10 extracts outgoing and incoming call information on a user who desires to take action for a suspicious call from the collected outgoing and incoming call information. The outgoing and incoming call information collecting server 10 processes users registered in the user information stored in the storage unit 15 in order.

In step S22, the outgoing and incoming call information collecting server 10 determines whether or not there is outgoing and incoming call information corresponding to suspicious call conditions in the outgoing and incoming call information extracted in step S21. In a case where the outgoing and incoming call information does not correspond to any one of the suspicious call conditions stored in the storage unit 15, the outgoing and incoming call information collecting server 10 causes the processing to proceed to step S24.

In a case where there is a relevant suspicious call condition, the outgoing and incoming call information collecting server 10 stores a set of the relevant suspicious call condition and a user in step S23. The session control servers 20A to 20C accommodating users are notified of the stored set of the suspicious call condition and the user in step S4 described above.

In step S24, the outgoing and incoming call information collecting server 10 determines whether or not the processes from step S21 to step S23 have been completed for requesting users. In a case where there is a requesting user who has not yet been processed, the outgoing and incoming call information collecting server 10 returns to step S21 to start analyzing outgoing and incoming call information of the next requesting user.

Figure 13:
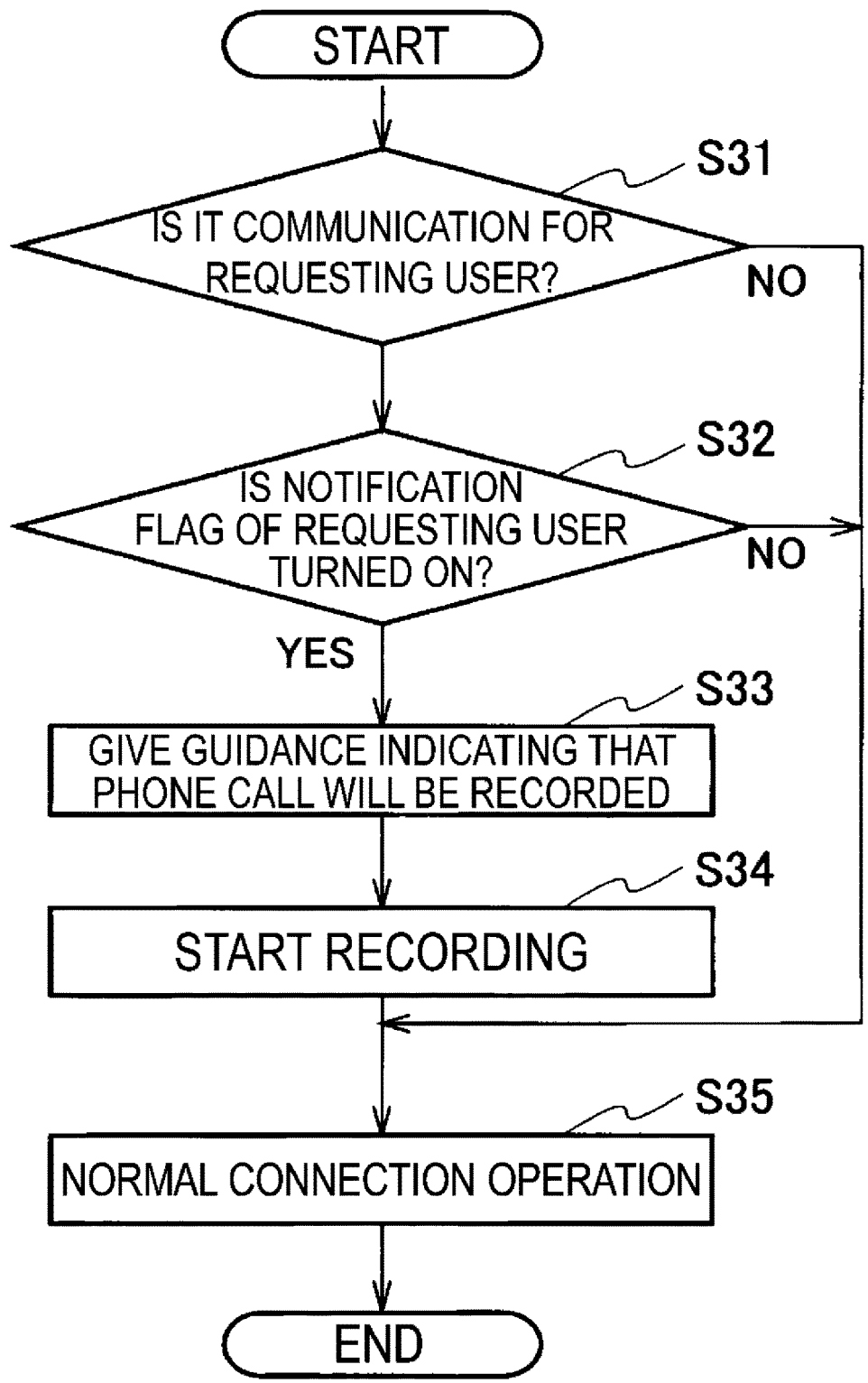
FIG. 13 is a flowchart illustrating a flow of processing of the session control server.

Next, a flow of processing of the session control server 20 will be described with reference to FIG. 13. The session control server 20 is configured to receive a notification of a suspicious call from the outgoing and incoming call information collecting server 10 and update a notification flag of user information. The processing of FIG. 13 is executed when the session control server 20 receives a call made to a user.

In step S31, the session control server 20 determines whether or not it is communication for a requesting user. The session control server 20 determines that a user who stores user information is a requesting user.

In a case where it is not communication for a requesting user, the session control server 20 proceeds to step S35 to execute a normal call connection operation.

In a case where it is communication for a requesting user, the session control server 20 determines whether or not a notification flag of the corresponding user is turned on (start) in step S32.

A call is not a suspicious call in a case where the notification flag is not turned on, and thus the session control server 20 proceeds to step S35 to execute a normal call connection operation.

In a case where the notification flag is turned on and a condition for executing an action is satisfied, the session control server 20 executes an action set for user information in steps S33 and S34. In the example in FIG. 13, the session control server 20 gives guidance indicating that a phone call will be recorded to a calling party in step S33. In step S34, the session control server 20 starts recording the phone call. Note that the condition for executing an action is assumed to be a case of an incoming call or a case of an outgoing call and an incoming call.

In step S35, the session control server 20 performs a normal call connection operation to cause a call to be transmitted to a user terminal accommodated in the session control server 20. The session control server 20 may give guidance indicating that a call will be recorded after the user terminal responds.

In the example in FIG. 13, the session control server 20 accommodating a called party executes an action; however, the session control server 20 accommodating a calling party of a suspicious call may monitor outgoing calls to execute an action.

Note that the outgoing and incoming call information collecting server 10 may execute an action. For example, the outgoing and incoming call information collecting server 10 gives a notification of a condition for monitoring in the session control server 20. When the session control server 20 has performed a phone call (transmission and reception of a call control signal related to a phone call) matching the notified condition, the session control server 20 notifies the outgoing and incoming call information collecting server 10 that the phone call has been performed. The outgoing and incoming call information collecting server 10 performs the transmission of a mail and gives a control instruction to the session control server 20 in response to the notification.

Figure 14:
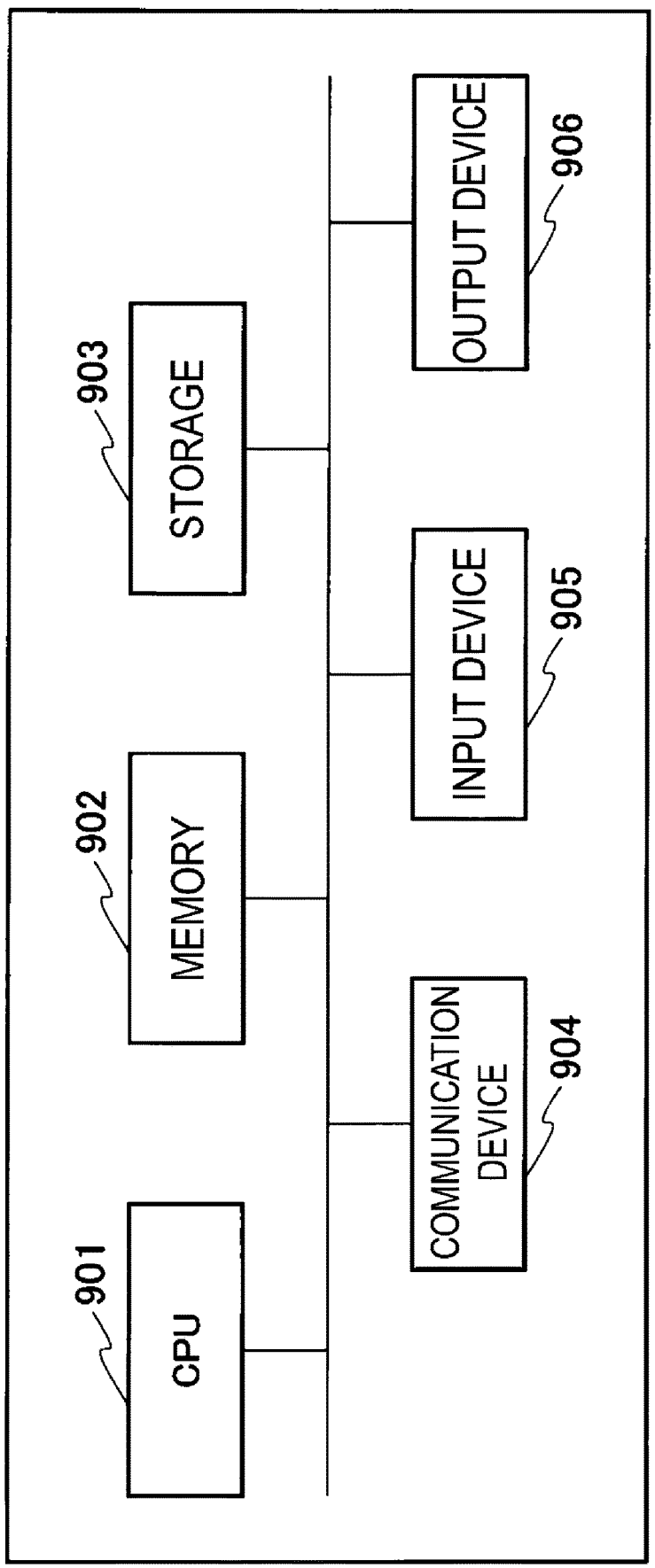
FIG. 14 is a diagram illustrating an example of a hardware configuration of the outgoing and incoming call information collecting server and the session control server.

A general-purpose computer system including a central processing unit (CPU) 901, a memory 902, a storage 903, a communication device 904, an input device 905, and an output device 906, for example, as illustrated in FIG. 14, can be used in the outgoing and incoming call information collecting server 10 and the session control server 20 described above. In the computer system, the CPU 901 executes a predetermined program loaded into the memory 902, and thus the outgoing and incoming call information collecting server 10 and the session control server 20 are realized. The program can also be recorded on a computer readable recording medium such as a magnetic disk, an optical disc, or a semiconductor memory or can also be distributed through a network. Note that each of the outgoing and incoming call information collecting server 10 and the session control server 20 may be mounted on a single computer or may be mounted on a plurality of computers. In addition, the outgoing and incoming call information collecting server 10 and the session control server 20 may be virtual machines implemented in a cloud.

As described above, the suspicious call handling system of the present embodiment includes the outgoing and incoming call information collecting server 10 and the session control servers 20A to 20C. Suspicious call conditions for determining a suspicious call may be set in the outgoing and incoming call information collecting server 10 in advance. When the outgoing and incoming call information collecting server 10 has found a phone call that matches the suspicious call conditions, the session control servers 20A to 20C accommodating a user to which the phone call is connected are notified of the phone call. In a case where the session control servers 20A to 20C detect a call transmitted to the notified user, the session control servers 20A to 20C execute an action that has been set in advance. Thereby, it is possible to handle a phone call considered to be a suspicious call without imposing a burden on a called party. In addition, it is determined whether or not the phone call is a phone call matching suspicious call conditions, and thus it is also possible to handle a suspicious incoming call from a new phone number.

REFERENCE SIGNS LIST

10 Outgoing and incoming call information collecting server
11 Collecting unit
12 Setting unit
13 Searching unit
14 User registration unit
15 Storage unit
20, 20A to 20C Session control server
21 Call control unit
22 Transmission unit
23 Reception unit
24 Action unit
25 Storage unit
30A to 30E User terminal

The invention claimed is:
1. A suspicious call handling system that detects and handles a suspicious call within a communication network, the suspicious call handling system comprising:
an outgoing and incoming call information collecting server; and
a session control server, wherein the outgoing and incoming call information collecting server includes a storage unit comprising one or more memory devices and configured to store a suspicious call condition, a collecting unit comprising one or more hardware processors configured to collect outgoing and incoming call information from each of a plurality of the session control servers within the communication network, and a searching unit comprising the one or more hardware processors configured to search for a phone call that matches the suspicious call condition from the outgoing and incoming call information and give a notification of the phone call to the session control server accommodating a user to which the phone call is connected, and the session control server includes an action unit configured to execute an action, which has been set in advance, in a case where it is detected that the phone call has been transmitted to the user who has received the notification from the outgoing and incoming call information collecting server.

2. The suspicious call handling system according to claim 1, wherein the session control server executes an action that has been set in advance for each user.

3. A suspicious call handling method of detecting and handling a suspicious call within a communication network, the suspicious call handling method comprising:

collecting outgoing and incoming call information from each of a plurality of session control servers within the communication network;

searching for a phone call that matches a suspicious call condition from the outgoing and incoming call information; and executing an action, which has been set in advance, in a case where the session control server accommodating a user to which the phone call is connected has detected the phone call transmitted to the user.

4. A non-transitory computer readable medium storing one or more instructions causing a computer to execute operations comprising:

collecting outgoing and incoming call information from each of a plurality of session control servers within a communication network;

searching for a phone call that matches a suspicious call condition from the outgoing and incoming call information; and executing an action, which has been set in advance, in a case where the session control server accommodating a user to which the phone call is connected has detected the phone call transmitted to the user.

* * * * *